United States Patent Office 2,992,266
Patented July 11, 1961

2,992,266
PREPARATION OF DIALKOXYBORANES
Albert D. McElroy, Evans City, and Roy M. Adams, Darlington, Pa., assignors to Callery Chemical Company, Pittsburgh, Pa., a corporation of Pennsylvania
No Drawing. Filed Apr. 1, 1955, Ser. No. 498,737
10 Claims. (Cl. 260—462)

A still further object of this invention is to provide a simple and economical method for preparing dimethoxyborane starting with an alkali metal borohydride, such as sodium borohydride, rather than diborane.

Other objects will become apparent from time to time throughout the specification and appended claims.

This new and improved method for preparing dialkoxyboranes will be more fully described hereinafter and the novelty thereof will be particularly pointed out and distinctly claimed.

This invention is based upon the discovery that an alkali metal borohydride, such as sodium borohydride ($NaBH_4$), will react with trialkoxyboroxines or solutions of boric oxide in trialkylborates using polyethylene glycol dialkyl ethers as the reaction medium to produce dialkoxyboranes more rapidly and in higher yields than is possible by any other known method. The reaction involved can be represented by either of the following chemical equations:

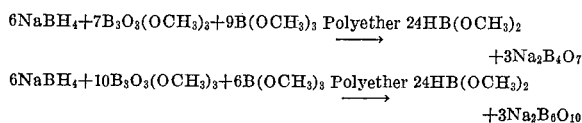

$$+3Na_2B_4O_7$$
$$6NaBH_4 + 10B_3O_3(OCH_3)_3 + 6B(OCH_3)_3 \text{ Polyether } 24HB(OCH_3)_2$$
$$+3Na_2B_6O_{10}$$

The advantages of carrying out these reactions in a polyethylene glycol dialkyl ether are: (1) higher yields of dialkoxyborane are obtained (2) faster rate of reaction and (3) easier handling of the reactants and by-products as slurries or solutions since both the trialkoxyboroxine and alkali metal borohydride are soluble in these ethers.

Extensive experiments were carried out in order to determine the factors which were most conducive in obtaining the best yields of dialkoxyborane. The apparatus used to conduct these experiments consisted of a 300 ml. 3-necked flask surrounded by a heating mantle. Through one neck of the flask was inserted a thermometer. The middle neck was equipped with a dropping funnel the stem of which reached below the liquid level of the reaction solution and was used to replenish the trimethyl borate during distillation. The third neck of the flask was fitted with a modified Claisen head to which was connected a condenser cooled to −80° C. The condenser was fitted with a graduated receiver from which samples of dialkoxyborane were periodically taken by using a hypodermic syringe. To the graduated cylinder was attached a series of −196° C. traps which led to a mercury bubbler, a water trap and a wet test meter. The meter was used to measure the hydrogen evolved upon hydrolysis of the various samples as well as the hydrogen evolved from the reaction. A magnetic stirrer was inserted inside the reaction flask to stir the mixture of alkali metal borohydride, polyethylene glycol dialkyl ether, trialkoxyboroxine and trialkylborate contained therein.

In one series of experiments, using the apparatus described the effect of the molar ratio of trimethoxyboroxine to sodium borohydride on the yield of dimethoxyborane was investigated using diethylene glycol dimethyl ether as a solvent with the following results. In each run the molar ratio of polyglycol ether to borohydride was 11:1 and the molar ratio of trimethyl borate to borohydride was 4:1.

| Run No. | Molar Ratio of $B_3O_3(OCH_3)_3$ to $NaBH_4$ | Pot. Temp., °C. | Percent Active (Hydridic) Hydrogen Evolved as $HB(OCH_3)_2$ |
|---------|---------------------------------|-----------------|-------------------------------------|
| 1       | 13:6                            | 100             | 92.3                                |
| 2       | 10:6                            | 106             | 83.5                                |
| 3       | 7:6                             | 106             | 74.5                                |
| 4       | 4:6                             | 106             | 33.8                                |

The data obtained show that a better yield of dimethoxyborane results when trimethoxyboroxine is present in excess over the amount of sodium borohydride used. Molar ratios of boroxine to borohydride within the range of 7:6 to 13:6 produce the best yields of dimethoxyborane. There is no particular advantage in using higher ratios and the yield drops off rapidly when ratios below this range are used. Some non-condensable gases were evolved which consisted mainly of hydrogen caused by the decomposition of impurities present in the reactants and solvent. When these impurities are removed, substantially quantitative yields of dimethoxyborane are obtained within the range of molar ratios shown.

In another series of experiments, tetraethylene glycol dimethyl ether was used as the solvent in place of diethylene glycol dimethyl ether in order to determine the effect of this ether upon the yield of dimethoxyborane produced at various ratios of trimethoxyboroxine to sodium borohydride. In each run the molar ratio of polyglycol ether to borohydride was 6.6:1 and molar ratio of trimethylborate to borohydride was 4:1.

| Run No. | Molar Ratio of $B_3O_3(OCH_3)_3$ to $NaBH_4$ | Pot. Temp., °C. | Percent Active (Hydridic) Hydrogen Evolved as $HB(OCH_3)_2$ |
|---------|---------------------------------|-----------------|-------------------------------------|
| 5       | 13:6                            | 110             | 84.2                                |
| 6       | 10:6                            | 95              | 73.0                                |
| 7       | 7:6                             | 125             | 80.9                                |
| 8       | 4:6                             | 100             | 42.5                                |

It is apparent from the data obtained that the highest yields of dimethoxyborane were obtained when the boroxine to borohydride molar ratio was kept within the range of 7:6 to 13:6. The yield drops off markedly when ratios below this range are used. In both diethylene glycol dimethyl ether and tetraethylene glycol di methyl ether, an excess of trimethoxyboroxine over the amount of sodium borohydride used produced a higher yield of dimethoxyborane. In both instances the reaction was substantially complete in about 2 hours compared to 12 hours or more when no polyglycol ether was used as the reaction medium.

In other experiments which were carried out it was found that a high trimethyl borate concentration produced a lower initial rate of dimethoxyborane but a higher total yield. In tetraethylene glycol dimethyl ether a 6.6 to 1 molar ratio of polyglycol ether to sodium borohydride resulted in better yields than using a ratio of 11:1. Other factors which were investigated had no significant effect upon the yield of dimethoxyborane obtained.

In still other experiments, it was found that the same trends were present when triethoxyboroxine, $$B_3O_3(OC_2H_5)_3$$

and tri-n-propoxyboroxine, $B_3O_3(OC_3H_7)_3$ were substituted for trimethoxyboroxine and reacted with sodium borohydride using a polyethylene glycol dialkyl ether as solvent to produce diethoxyborane and dipropoxyborane.

The dialkoxyboranes described herein are important and valuable intermediates in the preparation of diborane 
$(B_2H_6)$.

The term trialkoxyboroxine [$B_3O_3(OR)_3$] is intended to define the material having that composition and which is believed to be a chemical compound. It should be noted however that some chemists believe this material to be a solution of $B_2O_3$ in the trialkyl borate [$B(OR)_3$] rather than a compound. Because of this uncertainty the material is referred to both as the compound trialkoxyboroxine and as a solution of $B_2O_3$ in the alkyl borate [$B(OR)_3$]. The use of trialkoxyboroxine in this process does not appear to be materially affected when diluted with excess trialkyl borate or when containing excess $B_2O_3$ in solution.

Although several embodiments of this invention have been described using sodium borohydride it will be apparent to those skilled in the art that other alkali metal borohydrides may be used but sodium borohydride is preferred since it is the cheapest and most readily available of all the alkali metal borohydrides. It should, therefore, be understood that within the scope of the appended claims, this invention may be practiced otherwise than as specifically described.

What is desired to be claimed and secured by Letters Patent of the United States is:

1. A method of preparing lower alkyl dialkoxyboranes which comprises heating a mixture of a trialkoxyboroxine and an alkali metal borohydride in a polyethylene glycol dialkyl ether having the general formula $R(OC_2H_4)_nOR$ where R is a lower alkyl radical and $n$ is a number from 1 to 4 and recovering the dialkoxyborane formed.

2. A method of preparing lower alkyl dialkoxyboranes which comprises refluxing a mixture of a trialkoxyboroxine and an alkali metal borohydride in a polyethylene glycol dialkyl ether having the general formula $R(OC_2H_4)_nOR$ where R is a lower alkyl radical and $n$ is a number from 1 to 4 and evaporating from the mixture the dialkoxyborane formed.

3. A method of preparing dialkoxyboranes which comprises refluxing a mixture of a trialkoxyboroxine, $$B_3O_3(OR)_3$$

where R is a lower alkyl group, a trialkylborate, $B(OR'')_3$ where R'' is a lower alkyl group and an alkali metal borohydride, $MBH_4$, where M is an alkali metal, in a polyethylene glycol dialkyl ether $R(OC_2H_4)_nOR$ where R is a lower alkyl radical and $n$ is a number from 1 to 4, and recovering the dialkoxyborane formed.

4. A method according to claim 3 in which the polyethylene glycol dialkyl ether is $R^1(OC_2H_4)_nOR^1$, where $R^1$ is a methyl group and $n$ is an integer from 1 to 4.

5. A method according to claim 4 in which R is a methyl group and M is sodium.

6. A method according to claim 4 in which R is an ethyl group and M is sodium.

7. A method according to claim 4 in which R is a propyl group and M is sodium.

8. A method according to claim 5 in which the molar ratio of trimethoxyboroxine to alkali metal borohydride is within the range of 7:6 to 13:6.

9. A method according to claim 5 in which the molar ratio of polyethylene glycol dialkyl ether to alkali metal borohydride is within the range of 6.6:1 to 11:1.

10. A method according to claim 5 in which the molar ratio of trimethyl borate to alkali metal borohydride is about 4:1.

No references cited.

UNITED STATES PATENT OFFICE
Certificate of Correction

Patent No. 2,992,266            July 11, 1961

Albert D. McElroy et al.

It is hereby certified that error appears in the above numbered patent requiring correction and that the said Letters Patent should read as corrected below.

Column 1, line 9, before "A still further object" insert the following text:

This invention relates to the preparation of dialkoxyboranes represented by the general formula, $HB(OR)_2$ where R is a lower alkyl radical. In particular, it relates to a new and improved method for the preparation of dimethoxyborane, $HB(OCH_3)_2$, by the reaction of trimethoxyboroxine, $B_3O_3(OCH_3)_3$ or solutions of boric oxide in trimethylborate with alkali metal borohydrides in a polyethylene glycol dialkyl ether (having the general formula, $R(OC_2H_4)_nOR$ where R is a lower alkyl radical and $n$ is an integer from 1 to 4) as the reaction medium.

Dimethoxyborane was prepared by Schlesinger and Burg, J.A.C.S. 55, 4020 (1933), from diborane ($B_2H_6$) and methanol ($CH_3OH$) in yields of about 60%. This method required a large excess of diborane and the reaction was extremely exothermic requiring rigid temperature controls to prevent decomposition of the product. Later, Brown, Schlesinger and Burg, J.A.C.S. 61, 673 (1939), prepared dimethoxyborane from diborane and methyl formate. This reaction was much slower than the methanol reaction and required several hours to go to completion. Both of these methods use diborane as the starting material which makes them economically unattractive. Since dimethoxyborane is proposed to be used as an intermediate in the preparation of diborane any method based upon the use of diborane is obviously not feasible. It would therefore be highly desirable to use a cheaper and more readily available boron-containing compound, such as sodium borohydride as the starting material for the preparation of dimethoxyborane and other dialkoxyboranes.

It is an object of this invention to provide a new and economical method for preparing dialkoxyboranes, $HB(OR)_2$, in substantially quantitative yields by the reaction of trialkoxyboroxines, $B_3O_3(OR)_3$ or solutions of boric oxide in lower alkyl trialkyl borates with alkali metal borohydrides, $MBH_4$, where M is an alkali metal, using polyethylene glycol dialkyl ethers (having the general formula $R(OC_2H_4)_nOR$ where R is a lower alkyl radical and $n$ is a number from 1 to 4) as the reaction medium.

Another object is to provide a new and improved method for preparing dialkoxyboranes which will produce a faster reaction and higher yield and result in easier handling of the by-product than is possible by any other known method.

Signed and sealed this 21st day of November 1961.

[SEAL]

Attest:
ERNEST W. SWIDER
*Attesting Officer.*

DAVID L. LADD,
*Commissioner of Patents.*